US008358992B2

(12) United States Patent
Yu (10) Patent No.: US 8,358,992 B2
(45) Date of Patent: Jan. 22, 2013

(54) SYSTEM AND METHOD FOR THE WIRELESS TERMINAL RECEIVING SENSITIVITY PERFORMANCE TEST BASED ON DATA MODE (75) Inventor: Zhong Yu, Shenzhen Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 144 days.

(21) Appl. No.: 12/992,736

(22) PCT Filed: Dec. 31, 2008

(86) PCT No.: PCT/CN2008/073910
§ 371 (c)(1),
(2), (4) Date: Jan. 11, 2011

(87) PCT Pub. No.: WO2009/137980
PCT Pub. Date: Nov. 19, 2009

(65) Prior Publication Data
US 2011/0136457 A1 Jun. 9, 2011

(30) Foreign Application Priority Data
May 15, 2008 (CN) .......................... 2008 1 0100249

(51) Int. Cl.
H04B 1/06 (2006.01)
(52) U.S. Cl. ...................... 455/261; 455/67.12; 324/627; 342/174
(58) Field of Classification Search .................... 455/261
See application file for complete search history.

(56) References Cited

U.S. PATENT DOCUMENTS
6,127,980 A * 10/2000 Podgorski ...................... 343/703
(Continued)

FOREIGN PATENT DOCUMENTS
CN 101094488 12/2007
(Continued)

OTHER PUBLICATIONS
3rd Generation Partnership Project; Technical Specification Group Radio Access Network; Measurements of radio performances for UMTS terminals in speech mode (Release 7), 3GPP TR 25.914 V7.0.0, pp. 1-67, Jun. 2006.

(Continued)

Primary Examiner — Duc Nguyen
Assistant Examiner — Ajibola Akinyemi
(74) Attorney, Agent, or Firm — Bright IP Law Offices (57) ABSTRACT A method and system for the wireless terminal receiving sensitivity performance test based on a data mode are provided. The method comprises: building a human body model, in which the upper limb of the model holds the device under test at a predefined distance in front of the head of the model; taking the antenna of the device under test as the origin to build a spherical coordinate and selecting a testing point in the spherical coordinate; placing the model under the circumstance of a full-anechoic chamber; enabling the device under test to work in a data mode, and collecting the receiving power at the testing point in the spherical placement system using the testing antenna, so as to obtain the total power receiving sensitivity of the device under test. In this way, the performance influence on the mobile terminal from the human body coupling of the human being in a data mode can be actually reflected, the reality is high and the usage is easy.

4 Claims, 5 Drawing Sheets

U.S. PATENT DOCUMENTS

| | | | | |
|---|---|---|---|---|
| 7,079,086 B2 * | 7/2006 | Aisenbrey | | 343/872 |
| 7,190,301 B2 * | 3/2007 | Krenz et al. | | 342/1 |
| 8,019,307 B2 * | 9/2011 | Chen | | 455/280 |
| 2003/0003883 A1 * | 1/2003 | Wallace et al. | | 455/115 |
| 2004/0183547 A1 * | 9/2004 | Kildal | | 324/627 |
| 2005/0176375 A1 * | 8/2005 | Bednasz et al. | | 455/67.12 |
| 2006/0055592 A1 * | 3/2006 | Leather et al. | | 342/174 |
| 2007/0253555 A1 * | 11/2007 | Vernon | | 381/1 |
| 2010/0136510 A1 * | 6/2010 | Sakezles | | 434/274 |
| 2011/0084887 A1 * | 4/2011 | Mow et al. | | 343/703 |

FOREIGN PATENT DOCUMENTS

| | | |
|---|---|---|
| CN | 101106432 | 1/2008 |
| CN | 101132594 | 2/2008 |

OTHER PUBLICATIONS

International Search Report for International Application No. PCT/CN2008/073910 dated Mar. 26, 2009.

* cited by examiner

SYSTEM AND METHOD FOR THE WIRELESS TERMINAL RECEIVING SENSITIVITY PERFORMANCE TEST BASED ON DATA MODE

CROSS-REFERENCE TO RELATED APPLICATIONS

This application is a National Phase Application of PCT International Application No. PCT/CN2008/073910, International Filing Date Dec. 31, 2008, claiming priority of Chinese Patent Application No. 200810100249.4, filed May 15, 2008 which is hereby incorporated by reference in its entirety.

FIELD OF THE INVENTION

The invention relates to the field of communication, and in particular, to a system and method for the wireless terminal receiving sensitivity performance test based on a data mode.

BACKGROUND ART

In recent years, the radio-frequency performance test on a wireless terminal has attracted more and more attention. A whole machine receiving sensitivity performance test can objectively reflect the final emitting and receiving performance of a wireless terminal. At present, there are mainly two methods provided for evaluating the receiving sensitivity performance of a wireless terminal: one is known as passive test, which makes the determination based on the receiving sensitivity performance of the antenna and mainly focuses on evaluating the receiving sensitivity performance of a wireless terminal from the gain, the efficiency, the directional diagram and other radiation aspects of the antenna of the wireless terminal; and the other is known as active test, which tests spatial radio-frequency performances of a wireless terminal in a given microwave dark chamber, such as receiving sensitivity.

At present, only the wireless terminals passing full type approval (FTA) test can be sold on the market. In the FTA test, a radio-frequency performance test is mainly carried out on a wireless terminal in a cable connection mode, and no explicit regulation is given as to the spatial radio-frequency performance of the whole wireless terminal, however, over the air (OTA) test can make up the shortcomings of the FTA test in this aspect. Meanwhile, wireless terminal manufactures should have a clear understanding on the receiving sensitivity performance of the produced wireless terminals and need to improve the radio frequency emitting and receiving index of the wireless terminals through various measures; a wireless terminal with poor receiving sensitivity performance will bring much inconvenience to the user. In particular, when a wireless terminal is used for communication, the emitting and receiving performance thereof is reduced for the human body is close to the antenna of the wireless terminal, and consequently, the overall radio-frequency emitting and receiving performance of the wireless terminal is reduced. Therefore, the influence of the human body on the emitting and receiving performance of a wireless terminal should be quantitatively measured in the research and development process of the wireless terminal to carry out an optimization design so as to avoid a dramatic reduction in the emitting and receiving performance of the wireless terminal, that is, to reduce the electromagnetic coupling effect between the human body and an antenna. Transmitting parameters include total radiated power (TRP for short) and total radiated sensitivity (TRS for short).

TRS of a mobile terminal reflects the receiving sensitivity index of a wireless terminal on the whole radiating spherical surface as well as the fact that the receiving sensitivity of the whole wireless terminal is related to the conducting sensitivity of the wireless terminal and the receiving sensitivity of antenna.

$$TRS = \frac{4\pi}{\oint \left[ \frac{1}{EIS_\theta(\Omega; f)} + \frac{1}{EIS_\varphi(\Omega; f)} \right] d\Omega} \quad \text{formula (1)}$$

herein, effective isotropic sensitivity (EIS for short) defines an available antenna output power, for example, each polarization reaching the acceptable threshold, $\Omega$ is a three-dimensional angle for describing direction, f is frequency, $\theta$ and $\varphi$ are angle parameters of an orthogonal polarization.

$$TRS \approx \frac{2NM}{\pi \sum_{n=0}^{N-1} \sum_{m=0}^{M-1} \left[ \frac{1}{EIS_\theta(\theta_n, \varphi_m; f)} + \frac{1}{EIS_\varphi(\theta_n, \varphi_m; f)} \right] \sin(\theta_n)} \quad (2)$$

wherein N and M are multiple sampling intervals for $\theta$ and $\varphi$; $\theta_n$ and $\varphi_m$ are testing angles;

$EIS_\theta(\theta_n, \varphi_m)$ is the value of the horizontal polarization component of the equivalent omnidirectional receiving power of the testing point having angles of $\theta_n$ and $\varphi_m$, with the unit being milliwatt;

$EIS_\varphi(\theta_n, \varphi_m)$ is the value of the vertical polarization component of the equivalent omnidirectional receiving power of the testing point having angles of $\theta_n$ and $\varphi_m$, with the unit being milliwatt.

The currently used device and method for testing TRS of spatial radio-frequency performances both aim at a voice mode, only relating to free space or human head and not completely reflecting the influence of the electromagnetic coupling of antenna and human hand or even human body in a data mode, thus, the test result of the scheme above is not accurate.

SUMMARY OF THE INVENTION

Considering that in related technologies, existing TRS testing scheme for spatial radio-frequency performance test does not completely reflect the influence of the electromagnetic coupling of antenna and human hand or even human body in a data mode and the test result is consequently inaccurate, the present invention provides a method and a system for the wireless terminal receiving sensitivity performance test based on a data mode to solve at least one of the above problems.

In order to realize the above purpose, in accordance with one aspect of the invention, a method for the wireless terminal receiving sensitivity performance test based on a data mode is provided.

The method for the wireless terminal receiving sensitivity performance test based on a data mode comprises: building a human body model, in which the upper limb of the model holds the device under test (DUT for short) at a predefined distance in front of the head of the model; taking the antenna of the device under test as the origin to build a spherical coordinate and selecting a testing point in the spherical coordinate; placing the model under the circumstance of a full-anechoic chamber; enabling the device under test to work in a data mode, and collecting the receiving power at the testing point in the spherical placement system using the testing antenna, so as to obtain the total power receiving sensitivity of the device under test.

Preferably, the process of building the model further comprises: filling the model with artificial human tissue fluid.

Preferably, the testing antenna is a dual-polarized antenna.

Wherein, the receiving power collected at each testing point comprises a horizontal polarization component and a vertical polarization component.

Preferably, the process of obtaining the power receiving sensitivity of the device under test after collecting the horizontal polarization component and the vertical polarization component comprises: respectively obtaining the total receiving sensitivity at each testing point according to the following formula (1) and then normalizing the total receiving sensitivity at each testing point:

$$TRS = \frac{4\pi}{\oint \left[\frac{1}{EIS_\theta(\Omega; f)} + \frac{1}{EIS_\varphi(\Omega; f)}\right]d\Omega}, \quad \text{formula (1)}$$

wherein, TRS is the total receiving sensitivity at the current testing point, $\theta$ and $\varphi$ are testing angles, $EIS_\theta$ and $EIS_\varphi$ are a horizontal polarization component and a vertical polarization component respectively, $\Omega$ is the three-dimensional direction angle of the current testing point in the spherical coordinate, and f is the current working frequency of the device under test;

obtaining the total receiving sensitivity of the device under test according to the following formula (2):

$$TRS \approx \frac{2NM}{\pi \sum_{n=0}^{N-1} \sum_{m=0}^{M-1} \left[\frac{1}{EIS_\theta(\theta_n, \varphi_m; f)} + \frac{1}{EIS_\varphi(\theta_n, \varphi_m; f)}\right]} \quad \text{formula (2)}$$
$$\sin(\theta_n)$$

wherein, TRS is the total receiving sensitivity of the device under test, N and M are multiple sampling intervals for $\theta$ and $\varphi$ respectively, $EIS_\theta(\theta_n, \varphi_m)$ is the horizontal polarization component of the receiving power of the testing point having a testing angle of $\theta_n$ and $\varphi_m$, $EIS_\varphi(\theta_n, \varphi_m)$ is the vertical polarization component of the receiving power of the testing point having a testing angle of $\theta_n$ and $\varphi_m$, and f is the current working frequency of the device under test.

In order to realize the above purpose, in accordance with another aspect of the invention, a system for the wireless terminal receiving sensitivity performance test based on a data mode is provided.

The system for the wireless terminal receiving sensitivity performance test based on a data mode comprises: a full-anechoic chamber, configured to provide a testing circumstance for a wireless terminal; a human body model, wherein the upper limb of the model holds a device under test at a predefined distance in front of the head of the human body model; a spherical coordinate building and testing module, configured to take the antenna of the device under test as the origin to build a spherical coordinate and to select a testing point in the spherical coordinate; a spherical placement system, configured to control the angle position of the wireless terminal with respect to the testing antenna in the spherical coordinate; a testing antenna, configured to collect the receiving power of the wireless terminal at the testing point under the control of the spherical placement system when the wireless terminal is in a data mode; and a processing unit, configured to obtain the power receiving sensitivity of the device under test according to the receiving power of the wireless terminal at the testing point when the wireless terminal is in a data mode.

Preferably, the model is filled with artificial human tissue fluid.

Preferably, the testing antenna is a dual-polarized antenna.

Preferably, the receiving power collected at each testing point comprises a horizontal polarization component and a vertical polarization component.

With at least one of the above technical schemes, through the present invention, the performance influence of a human body coupling on a mobile terminal in a data mode could be reflected actually, the invention has higher facticity and is easy to use.

DETAILED DESCRIPTION OF THE INVENTION

Function Summary

In the technical schemes provided by the embodiments of the present invention, a human body model is built, the antenna of the device under test is taken as the origin to build a spherical coordinate and a testing point is selected in the spherical coordinate, then, the model is placed under the circumstance of a full-anechoic chamber, the device under test is set to work in a data mode, and the receiving power at the testing point is collected in the spherical placement system using the testing antenna, so as to obtain the total power receiving sensitivity of the device under test, wherein the upper limb of the model holds the device under test at a predefined distance in front of the head of the model. Compared with the prior art, the technical schemes provided by the embodiments of the invention is capable of actually reflecting the influence on a mobile terminal in a data mode from the coupling of the human body, and thereby having higher facticity.

The present invention will be described in detail hereinafter in the embodiments and drawings of the present invention.

It should be noted that, if no conflict is caused, the embodiments of the invention and features thereof can be combined with each other.

Method Embodiments of the Invention

According to an embodiment of the invention, a method for the wireless terminal receiving sensitivity performance test based on a data mode is provided.

Figure 1:
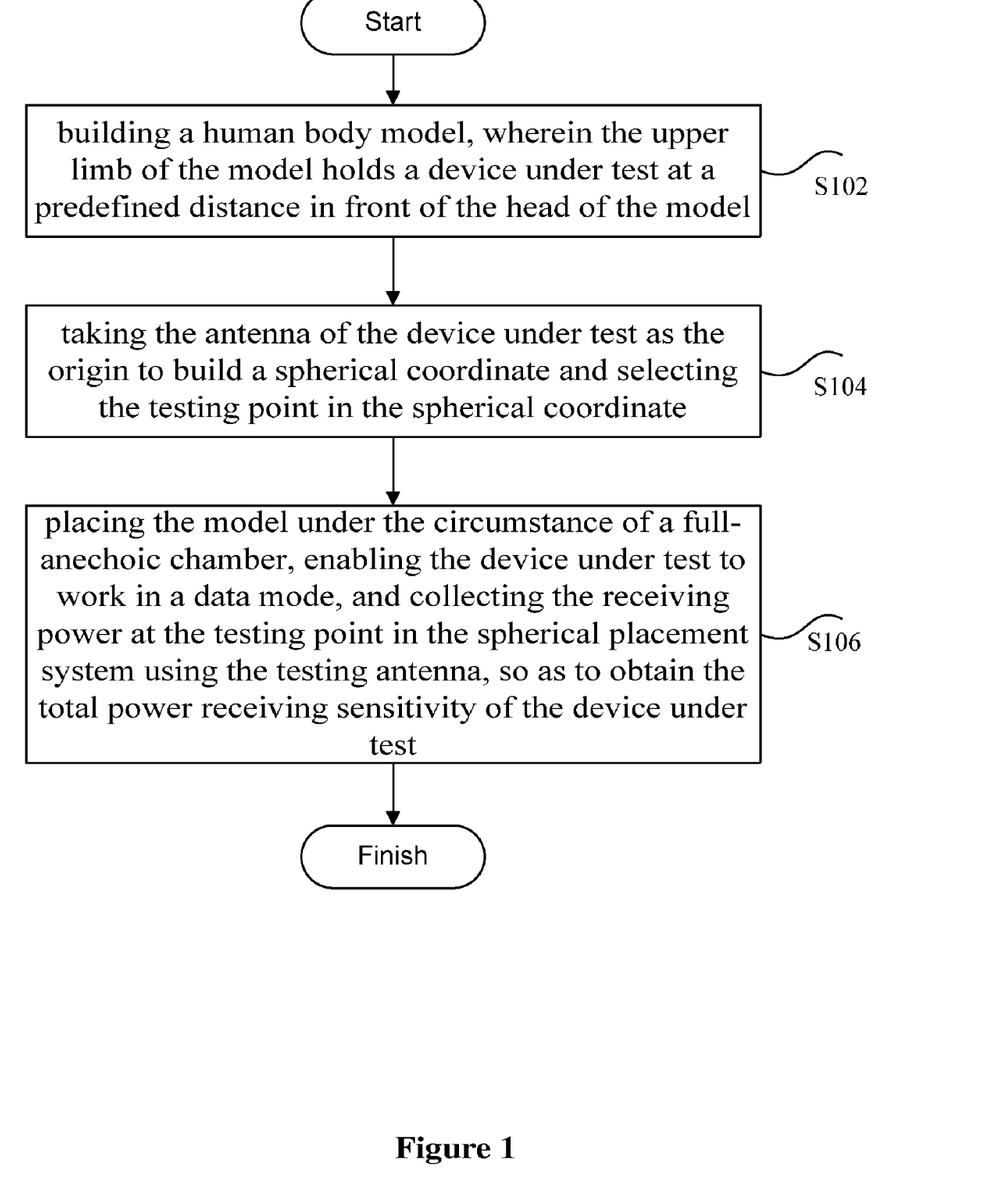
FIG. 1 is the flow diagram of the method for the wireless terminal receiving sensitivity performance test based on a data mode according to an embodiment of the method of the invention.
Figure 2:
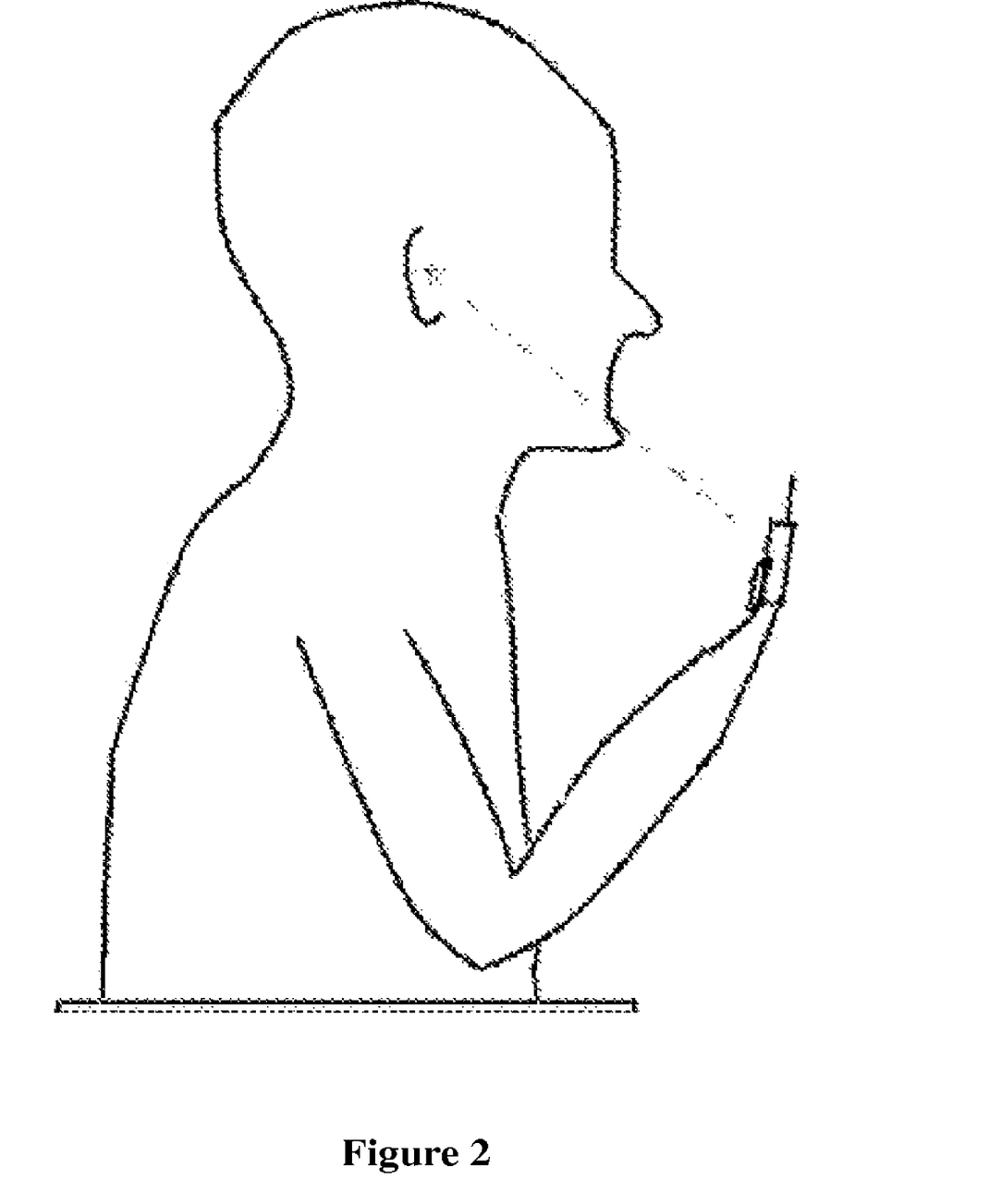
FIG. 2 is the schematic diagram of the human body model used in the method for the wireless terminal receiving sensitivity performance test based on a data mode according to an embodiment of the method of the invention.

FIG. 1 is the flow diagram of the method for the wireless terminal receiving sensitivity performance test based on a data mode according to an embodiment of the invention, as shown in FIG. 1, the method comprises the following steps (Steps S102-S106):

Step S102, building a human body model, wherein the upper limb of the model holds a device under test at a predefined distance in front of the head of the model, wherein the FIG. 2 schematically presents the human body model which the invention can use, as shown in FIG. 2, the model can be an upper body model. The processing of building a human body model further comprises: filling the model with artificial human tissue fluid;

Step S104, taking the antenna of the device under test as the origin to build a spherical coordinate and selecting the testing point in the spherical coordinate;

Step S106, placing the model under the circumstance of a full-anechoic chamber, enabling the device under test to work in a data mode, and collecting the receiving power at the testing point in the spherical placement system using the testing antenna, so as to obtain the total power receiving sensitivity of the device under test, and preferably, the testing antenna is a dual-polarized antenna.

Figure 3:
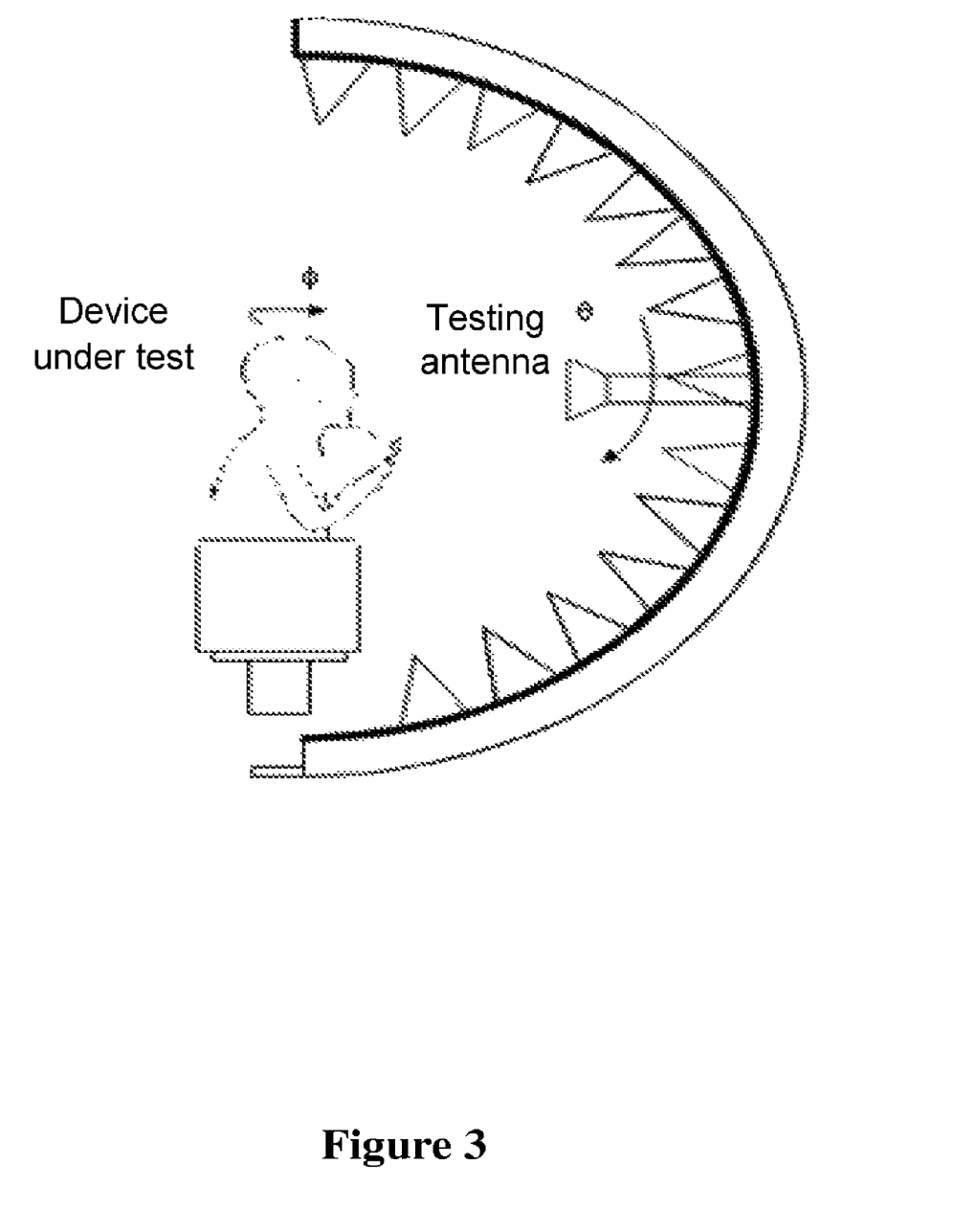
FIG. 3 is the schematic diagram of the placement of the human body model in the implementation process of the method for the wireless terminal receiving sensitivity performance test based on a data mode according to an embodiment of the method of the invention.

FIG. 3 is the schematic diagram of changing the angle of the terminal with respect to the testing antenna to make the testing antenna to sample at the testing point, wherein the model holding a terminal can rotate in the horizontal plane, the probe antenna can move on the plane vertical to the horizontal plane along the spherical surface to carry out a sampling to obtain the sampling result of each testing point. Of course, other rotation and/or moving manners can be used, and no more description is given here.

Wherein, the receiving power collected at each testing point comprises a horizontal polarization component and a vertical polarization component.

Preferably, the process of obtaining the power receiving sensitivity of the device under test after collecting the horizontal polarization component and the vertical polarization component specifically comprises: respectively obtaining the total receiving sensitivity at each testing point according to the following formula (1) and then normalizing the total receiving sensitivity at each testing point:

$$TRS = \frac{4\pi}{\oint \left[ \frac{1}{EIS_\theta(\Omega; f)} + \frac{1}{EIS_\varphi(\Omega; f)} \right] d\Omega}, \quad \text{formula (1)}$$

wherein TRS is the total receiving sensitivity at the current testing point, $\theta$ and $\phi$ are testing angles, $EIS_\theta$ and $EIS_\phi$ are the horizontal polarization component and the vertical polarization component respectively, $\Omega$ is the three-dimensional direction angle of the current testing point in the spherical coordinate, and f is the current working frequency of the device under test; and obtaining the total receiving sensitivity of the device under test according to the following formula (2):

$$TRS \approx \frac{2NM}{\pi \sum_{n=0}^{N-1} \sum_{m=0}^{M-1} \left[ \frac{1}{EIS_\theta(\theta_n, \varphi_m; f)} + \frac{1}{EIS_\varphi(\theta_n, \varphi_m; f)} \right] \sin(\theta_n)}, \quad \text{formula (2)}$$

wherein TRS is the total receiving sensitivity of the device under test, N and M are multiple sampling intervals for $\theta$ and $\phi$ respectively, $EIS_\theta(\theta_n, \phi_m)$ is the horizontal polarization component of the receiving power of the testing point having a testing angle of $\theta_n$ and $\phi_m$, $EIS_\phi(\theta_n, \phi_m)$ is the vertical polarization component of the receiving power of the testing point having a testing angle of $\theta_n$ and $\phi_m$, and f is the current working frequency of the device under test.

Figure 4:
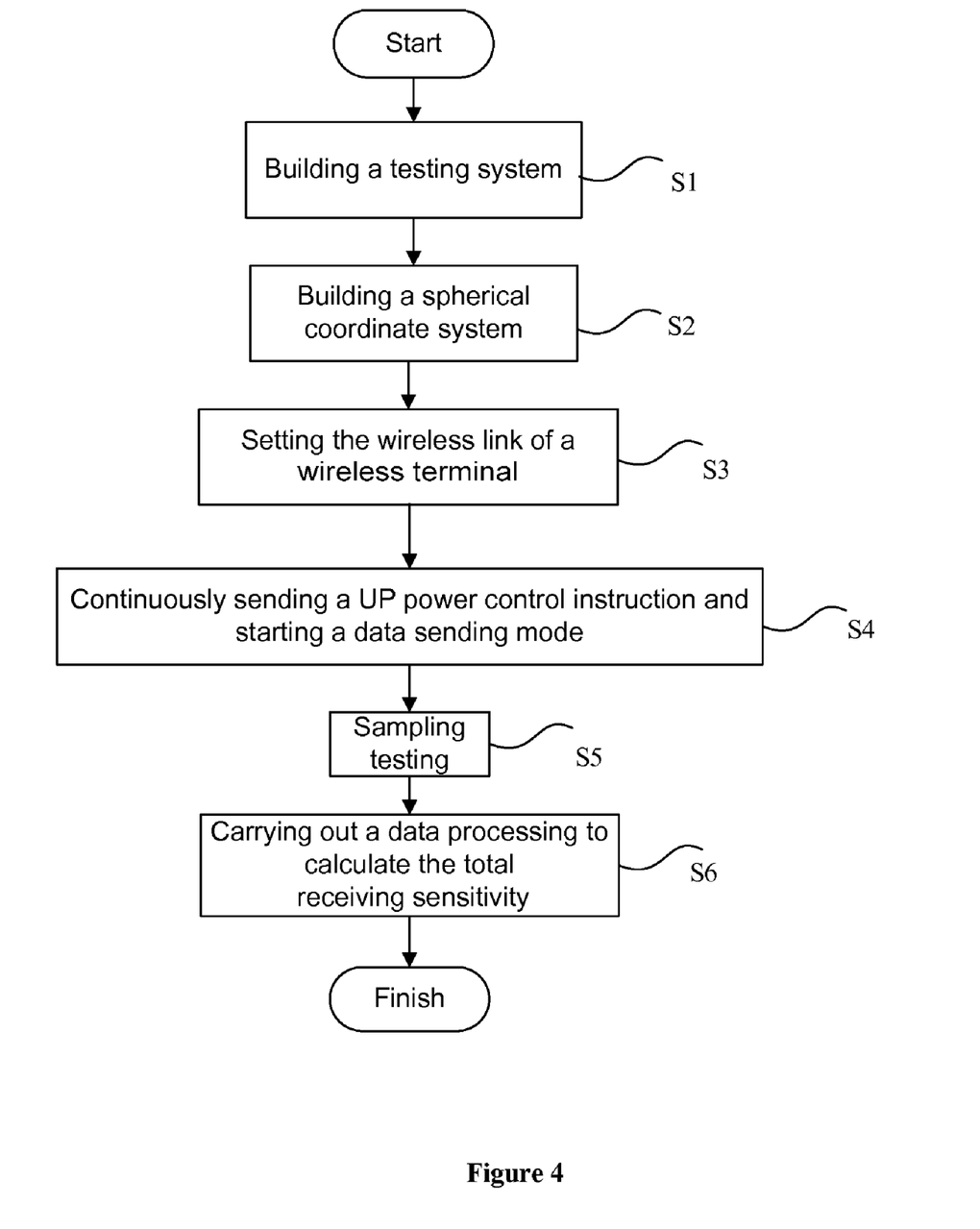
FIG. 4 is the flow diagram of the processing example of the method for the wireless terminal receiving sensitivity performance test based on a data mode according to an embodiment of the method of the invention.

FIG. 4 is the flow diagram of the processing example of the method for the wireless terminal receiving sensitivity performance test based on a data mode according to an embodiment of the method of the invention, as shown in FIG. 4, the method may include the following steps (Steps S1-S6) in practical application:

Step S1, setting the position of a wireless terminal in a data mode according to the human body model and building a testing system;

Step S2, building a spherical coordinate system by taking the position of the antenna of the wireless terminal as the origin and selecting the testing point;

Step S3, setting the wireless link of the wireless terminal and enabling the wireless link to be in a normal working state to meet the testing conditions;

Step S4, continuously sending UP power control instructions to the wireless terminal until the BER (bit error rate) of the wireless terminal reaches a target value and the conventional maximum power is reached, starting a data sending mode;

Step S5, carrying out a sampling test at the testing point and respectively collecting, in the horizontal direction and the vertical direction, the horizontal polarization component $EIS_\theta(\theta_n, \phi_m)$ and the vertical polarization component $EIS_\theta(\theta_n, \phi_m)$ of equivalent omnidirectional receiving power;

Step S6, carrying out a linear averaging on the data collected at the testing points to obtain a desired total receiving sensitivity TRS.

Steps S1-S6 are described in detail below.

Step S1, setting the position of a wireless terminal in a data mode according to the human body model and building a testing system. As shown in FIG. 2, the human body model is required to simulate a real human holding the wireless terminal in a data mode in one hand or two hands. The human body model includes a head, a hand holding a wireless terminal and the upper part or the whole part of the body. In the testing circumstance, the origin of the spherical coordinate is transferred to the position of the current device, namely, in the vicinity of the chest of the human body model. The human body model is filled with artificial human tissue fluid, the formula of which meets standard and related regulation: for example, the following formula can be used: water (45.3%), sugar (54.3%), hydroxyethylcellulose (0.3%) and antiseptic (0.1%), the percentages above are weight percentages. Moreover, the hand is at a predefined distance away from the head, for example, 40 cm; in addition, the hand is also at a predefined distance away from the chest, for example, 20 cm, and the joint of the upper limb of the built human body model is movable. Therefore, the distance between the hand-hold wireless terminal and the head or the chest is adjustable.

Step S2, building a spherical coordinate system by taking the position of the antenna of the wireless terminal as the origin and selecting a testing point, specifically, two positioning systems of a combined shaft system and a distributed shaft system can be defined based on a spherical test method, wherein in the combined shaft system, two rotary shafts are independent from each other, a Phi shaft positioner is installed on the basis of a Theta shaft positioner, then the DUT can rotate around the two shafts synchronously, while in the distributed shaft system, two rotary shafts are combined with each other, a testing antenna can rotate around a Theta shaft, and the DUT can rotate around a Phi shaft.

Step S3, setting the wireless link of the wireless terminal and enabling the wireless link to be in a normal working state to meet the testing conditions; preferably, in this step, the DUT should select a high frequency channel, an intermediate frequency channel and a low frequency channel from all the frequency bands it supports to establish a link to carry out the test. The DUP of a telescopic antenna should be tested in both extended state and contracted state. In TRS test, a relative sensitivity test should be carried out in the intermediate channel while the maximum interval condition is met, which requires to find the testing point with the optimal receiving sensitivity in the whole testing channel, regulate the position and the testing polarization of the positioner to be accordant with the point with the optimal receiving sensitivity, regulate the output power of the simulator of a base station to be greater than the optimal receiving sensitivity, which is a predefined value, such as, +5 dB, and test the sensitivity of the DUT in the intermediate channel under the power condition above; wherein the sensitivity of the intermediate channel should not be beyond the bit error rate/frame error rate of the whole testing channel.

Step S4, continuously sending UP power control instructions to the constant until the BER of the wireless terminal reaches a target value of at least 20000 bits 1.0%±0.2% and the conventional maximum power is reached, starting a data sending mode.

Step S5, carrying out a sampling test at the testing point and respectively collecting the horizontal polarization component $EiRP_\theta(\theta_n, \phi_m)$ and the vertical polarization component $EIS_\phi(\theta_n, \phi_m)$ of equivalent omnidirectional receiving power in the horizontal direction and the vertical direction; an effective sampling can be carried out in a three-dimensional space and the receiving sensitivity of each testing point can be measured by controlling the position of the DUT with respect to the testing antenna, then, the tested EIS data is normalized by the following formula (3);

$$\Delta \overline{EIS} = \frac{1}{n}\sum_{i=1}^{n} EISstd_i - EISnstd_i \qquad \text{formula (3)}$$

wherein $EISstd_i$ is standard sensitivity measurement, $EISnstd_i$ is the power measurement of a non-standard modulation, and n is the number of reference testing points;

Step S6, calculating the spatial radio-frequency performance receiving sensitivity index TRS of the wireless terminal or other wireless products with the data collected at the testing points according to the formulae (1) and (2).

Although the embodiment of the invention is described above by taking the upper body model as the example, a whole human body model can be adopted for measurement in the embodiment.

System Embodiments of the Invention

Figure 5:
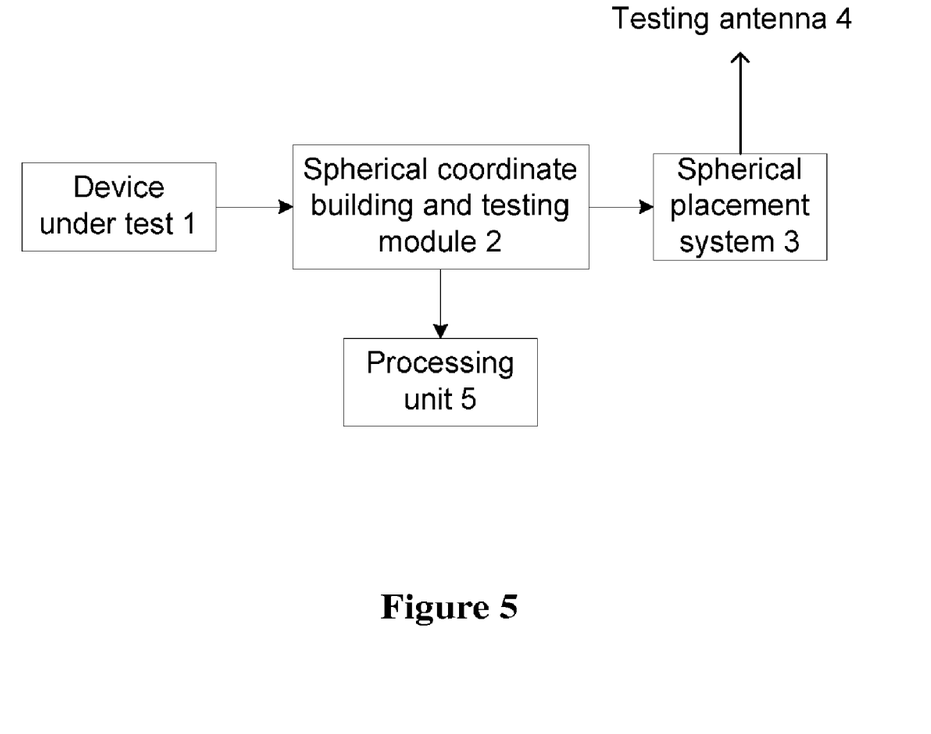
FIG. 5 is the preferable frame diagram of the system for the wireless terminal receiving sensitivity performance test based on a data mode according to an embodiment of the system of the invention.

In accordance with one embodiment of the invention, the system for the wireless terminal receiving sensitivity performance test based on a data mode can comprise a full-anechoic chamber, configured to provide a testing circumstance for a wireless terminal and a human body model (hereinafter, model for short), wherein the upper limb of the model holds the device under test at a predefined distance in front of the head of the model, the distance, to which no limitation is given by this invention, can be flexibly adjusted by simulating the practical application scenarios according to the requirements of the test, the design or the implementation, without causing any influence on the essence of the invention. FIG. 5 is the preferable frame diagram of the system for the wireless terminal receiving sensitivity performance test based on a data mode according to the system embodiments of the invention, as shown in FIG. 5, the system comprises a device under test 1 and preferably comprises the following functional modules: a spherical coordinate building and testing module 2, configured to take the antenna of the device under test as the origin to build a spherical coordinate and to select a testing point in the spherical coordinate; a spherical placement system 3, configured to control the angle position of the wireless terminal with respect to the testing antenna in the spherical coordinate; a testing antenna 4, configured to collect the receiving power of the wireless terminal at the testing point under the control of the spherical placement system 3 when the wireless terminal is in a data mode; and a processing unit 5, configured to obtain the power receiving sensitivity of the device under test 1 according to the receiving power of the wireless terminal at testing point when the wireless terminal is in a data mode.

Preferably, the human body model can be an upper body model or a whole human body model, which is filled with artificial human tissue fluid.

In practical application, the full-anechoic chamber can fully insulate the electromagnetic interference from external environment and maintain the shielding effectiveness thereof in the range from 800 Hz to 4 GHz to meet the requirements of EN50147-1 standard. The size of the silent zone of the full-anechoic chamber should meet test requirements.

The spherical coordinate building and testing module 2 configured to build a spherical coordinate, and for a wireless communication product, to build a spherical coordinate defined by an axis x, an axis y and an axis z by taking the wireless communication product as the origin. Angle θ is the included angle between the testing point and the positive direction of the axis z, angle φ is the included angle between the positive direction of the axis x and the projection point of the testing point in the plane defined by the axis x and the axis y, and to select the testing coordinate point in the spherical coordinate.

The spherical placement system 3: in order to cover the whole spherical surface, the final structure of the testing circumstance consists of a support structure and a testing placer for holding the DUT and manipulating the DUT with respect to the testing antenna, this system is a radiation model capable of moving a DUT/model and/or the testing antenna to cover the whole spherical surface of the DUT to realize a sampling at each testing point.

Preferably, the testing antenna 4 may be a dual-polarized antenna which is used for obtaining two orthogonal components of the electric field component at each point of the spherical surface. At this time, the receiving power collected at each testing point comprises a horizontal polarization component and a vertical polarization component.

The device under test (DUT) mentioned above may include a single-mode terminal, the single mode here includes time division-synchronization code division multiple access (TD-SCDMA), wideband code division multiple access (WCDMA), code division multiple access (CDMA), global system for mobile communication (GSM), personal handy-phone system (PHS, also known as Little Smart), Bluetooth, wireless local area network (wireless LAN), global positioning system (GPS), radio frequency ID (RFID) and worldwide Interoperability for microwave access (WiMAX) and other communication modes or combinations thereof.

In summary, with the technical schemes of the invention, the performance influence of a human body coupling on the mobile terminal in a data mode could be reflected actually, the invention has higher facticity and is easy to use.

Obviously, it should be understood by those skilled in the art that the modules or steps of the invention can be realized by universal computers, centralized on a single computer or distributed on the network consisting of multiple computers, and optionally, realized by computer-executable program codes, and the modules or steps can be therefore stored in a storage device to be executed by computers or manufactured into integrated circuit modules respectively, or some of the modules or steps are manufactured into a single integrated circuit module. Thus, the invention is not limited to any special combination of hardware and software.

The mentioned above is only preferable embodiments of the invention but not limitation for the invention, various modification and variations can be devised by those skilled in the art, and it should be understood that any modification, equivalent and improvement devised without departing from the spirit and principle of the invention belong to the protection scope of the invention.

The invention claimed is:

1. A method for a wireless terminal receiving sensitivity performance test based on a data mode, comprising:
   building a human body model, in which an upper limb of the model holds a device under test at a predefined distance in front of head of the model;
   taking antenna of the device under test as origin to build a spherical coordinate and selecting a testing point in the spherical coordinate; and
   placing the model under circumstance of a full-anechoic chamber, enabling the device under test to work in a data mode, and collecting receiving power at the testing point in the spherical placement system using a testing antenna, so as to obtain total power receiving sensitivity of the device under test, wherein the testing antenna is a dual-polarized antenna, wherein the receiving power collected at each testing point comprises a horizontal polarization component and a vertical polarization component, and wherein the process of obtaining the power receiving sensitivity of the device under test after collecting the horizontal polarization component and the vertical polarization component comprises:
   respectively obtaining the total receiving sensitivity at each testing point according to the following formula (1) and then normalizing the total receiving sensitivity at each testing point:

$$TRS = \frac{4\pi}{\oint \left[ \frac{1}{EIS_\theta(\Omega; f)} + \frac{1}{EIS_\varphi(\Omega; f)} \right] d\Omega}, \quad \text{formula (1)}$$

wherein TRS is the total receiving sensitivity at the current testing point, $\theta$ and $\varphi$ are testing angles, $EIS_\theta$ and $EIS_\varphi$ are a horizontal polarization component and a vertical polarization component respectively, $\Omega$ is the three-dimensional direction angle of the current testing point in the spherical coordinate, and f is the current working frequency of the device under test; and obtaining the total receiving sensitivity of the device under test according to the following formula (2):

$$TRS \approx \frac{2NM}{\pi \sum_{n=0}^{N-1} \sum_{m=0}^{M-1} \left[ \frac{1}{EIS_\theta(\theta_n, \varphi_m; f)} + \frac{1}{EIS_\varphi(\theta_n, \varphi_m; f)} \right] \sin(\theta_n)}, \quad \text{formula (2)}$$

wherein TRS is the total receiving sensitivity of the device under test, N and M are multiple sampling intervals for $\theta$ and $\varphi$ respectively, $EIS_\theta(\theta_n, \varphi_m)$ is the horizontal polarization component of the receiving power of the testing point having a testing angle of $\theta_n$ and $\varphi_m$, $EIS_\varphi(\theta_n, \varphi_m)$ is the vertical polarization component of the receiving power of the testinu point having a testing angle of $\theta_n$ and $\varphi_m$, and f is the current working frequency of the device under test.

2. The method according to claim 1, wherein the process of building a human body model further comprises:
   filling the model with artificial human tissue fluid.

3. A system for a wireless terminal receiving sensitivity performance test based on a data mode, comprising:
   a full-anechoic chamber, configured to provide a testing circumstance for the wireless terminal;
   a human body model, an upper limb of which holds a device under test at a predefined distance in front of head of the human body model;
   a spherical coordinate building and testing module, configured to take an antenna of the device under test as origin to build a spherical coordinate and to select a testing point in the spherical coordinate;
   a spherical placement system, configured to control an angle position of the wireless terminal with respect to a testing antenna in the spherical coordinate;
   the testing antenna, configured to collect the receiving power of the wireless terminal at the testing point under control of the spherical placement system when the wireless terminal is in a data mode; and
   a processing unit, configured to obtain power receiving sensitivity of the device under test according to receiving power of the wireless terminal at the testing point when the wireless terminal is in a data mode, wherein the testing antenna is a dual-polarized antenna, wherein the receiving power collected at each testing point comprises a horizontal polarization component and a vertical polarization component and wherein the process of obtaining the power receiving sensitivity of the device under test after collecting the horizontal polarization component and the vertical polarization component comprises:
   respectively obtaining the total receiving sensitivity at each testing point according to the following formula (1) and then normalizing the total receiving sensitivity at each testing point:

$$TRS = \frac{4\pi}{\oint \left[ \frac{1}{EIS_\theta(\Omega; f)} + \frac{1}{EIS_\varphi(\Omega; f)} \right] d\Omega}, \quad \text{formula (1)}$$

wherein TRS is the total receiving sensitivity at the current testing point, $\theta$ and $\varphi$ are testing angles, $EIS_\theta$ and $EIS_\varphi$ are a horizontal polarization component and a vertical polarization component respectively, $\Omega$ is the three-dimensional direction angle of the current testing point in the spherical coordinate, and f is the current working frequency of the device under test: and obtaining the total receiving sensitivity of the device under test according to the following formula (2):

$$TRS \approx \frac{2NM}{\pi \sum_{n=0}^{N-1} \sum_{m=0}^{M-1} \left[ \frac{1}{EIS_\theta(\theta_n, \varphi_m; f)} + \frac{1}{EIS_\varphi(\theta_n, \varphi_m; f)} \right] \sin(\theta_n)}, \quad \text{formula (2)}$$

wherein TRS is the total receiving sensitivity of the device under test, N and M are multiple sampling intervals for θ and φ respectively, $EIS_\theta(\theta_n, \phi_m)$ is the horizontal polarization component of the receiving power of the testing point having a testing angle of $\theta_n$ and $\phi_m$, $EIS_\phi(\theta_n, \phi_m)$ is the vertical polarization component of the receiving power of the testing point having a testing angle of $\theta_n$ and $\phi_m$, and f is the current working frequency of the device under test.

4. The system according to claim 3, wherein the human body model is filled with artificial human tissue fluid.

* * * * *